(12) United States Patent
Shinozaki

(10) Patent No.: US 12,456,313 B2
(45) Date of Patent: Oct. 28, 2025

(54) ELECTRONIC DEVICE, INFORMATION PROCESSING APPARATUS, AND METHOD FOR DETECTING GAZE LINES

(71) Applicant: KYOCERA Corporation, Kyoto (JP)

(72) Inventor: Takayuki Shinozaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 374 days.

(21) Appl. No.: 18/004,175

(22) PCT Filed: Jul. 1, 2021

(86) PCT No.: PCT/JP2021/025041
§ 371 (c)(1),
(2) Date: Jan. 3, 2023

(87) PCT Pub. No.: WO2022/014353
PCT Pub. Date: Jan. 20, 2022

(65) Prior Publication Data
US 2023/0267752 A1  Aug. 24, 2023

(30) Foreign Application Priority Data
Jul. 17, 2020 (JP) ................................. 2020-123233

(51) Int. Cl.
*G06V 20/59* (2022.01)
*G06V 10/70* (2022.01)

(52) U.S. Cl.
CPC ............ *G06V 20/597* (2022.01); *G06V 10/70* (2022.01)

(58) Field of Classification Search
None
See application file for complete search history.

(56) References Cited

U.S. PATENT DOCUMENTS

| 8,085,140 B2* | 12/2011 | Mochizuki ............ B60W 40/02 340/576 |
| 2015/0339589 A1* | 11/2015 | Fisher .................. G06V 10/454 706/12 |

(Continued)

FOREIGN PATENT DOCUMENTS

| JP | 2006-048171 A | 2/2006 |
| JP | 2015-207163 A | 11/2015 |
| WO | 2008029802 A1 | 3/2008 |

OTHER PUBLICATIONS

Ahlstrom et al., "Processing of Eye/Head-Tracking Data in Large-Scale Naturalistic Driving Data Sets," IEEE Transactions on Intelligent Transportation Systems, vol. 13, No. 2, Jun. 2012 (Year: 2012).*

*Primary Examiner* — Soo Shin
(74) *Attorney, Agent, or Firm* — Studebaker Brackett PLLC

(57) ABSTRACT

An electronic device 10 includes an imaging unit 11, a gaze-line detector 12, and a controller 14. The imaging unit 11 is configured to create at least one image corresponding to a view by image capturing. The gaze-line detector is configured to detect a gaze line of a subject, the gaze line being directed to the view. The controller 14 is configured to serve as a first inference unit 15 and a second inference unit 16. The first inference unit 15 is capable of inferring a gaze-line prediction map based on the at least one image. The second inference unit 16 is capable of inferring biological information regarding an alertness level of the subject based on the gaze-line prediction map and the gaze line of the subject.

6 Claims, 5 Drawing Sheets

(56) References Cited

U.S. PATENT DOCUMENTS

| | | | |
|---|---|---|---|
| 2016/0196098 A1* | 7/2016 | Roth | G06F 3/012 |
| | | | 715/761 |
| 2018/0095533 A1* | 4/2018 | Song | H04N 23/698 |
| 2020/0051367 A1* | 2/2020 | Larsen | G07F 17/3239 |
| 2021/0056306 A1* | 2/2021 | Hu | G06F 18/217 |
| 2021/0088784 A1* | 3/2021 | Whitmire | G02B 27/0101 |
| 2021/0153752 A1* | 5/2021 | Park | A61B 5/0205 |
| 2021/0181837 A1* | 6/2021 | Jiang | G06F 3/011 |
| 2023/0206488 A1* | 6/2023 | Puri | G06V 20/597 |
| | | | 382/100 |

\* cited by examiner

ELECTRONIC DEVICE, INFORMATION PROCESSING APPARATUS, AND METHOD FOR DETECTING GAZE LINES

CROSS-REFERENCE TO RELATED APPLICATIONS

This application claims priority from Japanese Patent Application No. 2020-123233 filed Jul. 17, 2020, the content of which is all incorporated herein by reference.

TECHNICAL FIELD

The present disclosure relates to an electronic device, an information processing apparatus, a method for inference, and a program for inference.

BACKGROUND ART

Driving a movable object safely requires the attention of the driver. Thus, studies have been conducted on issuing a warning to the driver or providing assistance in driving when a decrease in the attention of the driver is observed. A proposed method for observing the attention includes calculating cumulative visibility, which is obtained by accumulating the degree of overlap between a gaze line and an object such as an oncoming vehicle around the driver's vehicle, and comparing the cumulative visibility with a reference value (refer to PTL 1). An attention inference system has also been proposed. The attention inference system is configured to infer whether a subject to be monitored visually recognizes an object to be viewed (refer to PTL 2).

CITATION LIST

Patent Literature

PTL 1: International Publication No. 2008-029802
PTL 2: Japanese Unexamined Patent Application Publication No. 2015-207163

SUMMARY OF INVENTION

To address the problems described above, an electronic device according to a first aspect includes
an imaging unit configured to create at least one image corresponding to a view by image capturing;
a gaze-line detector configured to detect a gaze line of a subject, the gaze line being directed to the view; and
a controller configured to estimate an alertness level of the subject based on the at least one image and the gaze line,
wherein the controller is configured to serve as
a first inference unit capable of inferring a gaze-line prediction map that is based on the at least one image and that represents a probability of finding the gaze line at each position in the at least one image, the first inference unit being constructed based on learning data obtained by machine learning regarding a relationship between a training image and a gaze line of a subject for training, the gaze line being directed to the training image, and
a second inference unit capable of inferring biological information regarding the alertness level of the subject based on the gaze-line prediction map and the gaze line of the subject, the second inference unit being constructed based on learning data obtained by machine learning regarding a relationship among a gaze-line prediction map for training inferred by the first inference unit based on the training image, the gaze line of the subject for training, the gaze line being directed to the training image, and biological information regarding an alertness level of the subject for training.

An information processing apparatus according to a second aspect includes
an acquiring unit configured to acquire at least one image corresponding to a view and a gaze line of a subject, the gaze line being directed to the view;
a controller configured to estimate an alertness level of the subject based on the at least one image and the gaze line; and
an output unit configured to output the alertness level,
wherein the controller is configured to serve as a first inference unit capable of creating a gaze-line prediction map that is based on the at least one image and that represents a frequency of finding the gaze line in the at least one image, the first inference unit being constructed based on learning data obtained by machine learning regarding a relationship between a training image and a gaze line of a subject for training, the gaze line being directed to the training image, and as a second inference unit capable of inferring biological information regarding the alertness level of the subject based on the gaze-line prediction map and the gaze line of the subject, the second inference unit being constructed based on learning data obtained by machine learning regarding a relationship among a gaze-line prediction map for training inferred by the first inference unit based on the training image, the gaze line of the subject for training, the gaze line being directed to the training image, and biological information regarding an alertness level of the subject for training.

A method for inference according to a third aspect includes the steps of:
creating at least one image corresponding to a view by image capturing;
detecting a gaze line of a subject, the gaze line being directed to the view; and
estimating an alertness level of the subject based on the at least one image and the gaze line,
wherein the step of estimating includes
a first inference step in which a gaze-line prediction map can be inferred based on the at least one image, the gaze-line prediction map representing a probability of finding the gaze line at each position in the at least one image, the first inference step being constructed based on learning data obtained by machine learning regarding a relationship between a training image and a gaze line of a subject for training, the gaze line being directed to the training image, and
a second inference step in which biological information regarding the alertness level of the subject can be inferred based on the gaze-line prediction map and the gaze line of the subject, the second inference step being constructed based on learning data obtained by machine learning regarding a relationship among a gaze-line prediction map for training inferred in the first inference step based on the training image, the gaze line of the subject for training, the gaze line being directed to the training image, and biological information regarding an alertness level of the subject for training.

A program for inference according to a fourth aspect causes
a computer to serve as
an imaging unit configured to create at least one image corresponding to a view by image capturing;
a gaze-line detector configured to detect a gaze line of a subject, the gaze line being directed to the view; and
a controller configured to estimate an alertness level of the subject based on the at least one image and the gaze line,
wherein the controller is configured to serve as
a first inference unit capable of inferring a gaze-line prediction map that is based on the at least one image and that represents a probability of finding the gaze line at each position in the at least one image, the first inference unit being constructed based on learning data obtained by machine learning regarding a relationship between a training image and a gaze line of a subject for training, the gaze line being directed to the training image, and
a second inference unit capable of inferring biological information regarding the alertness level of the subject based on the gaze-line prediction map and the gaze line of the subject, the second inference unit being constructed based on learning data obtained by machine learning regarding a relationship among a gaze-line prediction map for training inferred by the first inference unit based on the training image, the gaze line of the subject for training, the gaze line being directed to the training image, and biological information regarding an alertness level of the subject for training.

DESCRIPTION OF EMBODIMENTS

Hereinafter, a description will be provided with regard to an electronic device according to an embodiment of the present disclosure with reference to the drawings. The following description also applies to an information processing apparatus, a method for inference, and a program for inference according to the present disclosure.

An electronic device according to an embodiment of the present disclosure is fitted to, for example, a movable object. Examples of a movable object may include a vehicle, a vessel, and an aircraft. Examples of a vehicle may include an automobile, an industrial vehicle, a rail car, a resident car, and a fixed-wing aircraft that taxies along a runway. Examples of an automobile may include a passenger car, a truck, a bus, a motorcycle, and a trolleybus. Examples of an industrial vehicle may include vehicles for agriculture and vehicles for construction. Examples of an industrial vehicle may include a forklift truck and a golf cart. Examples of an industrial vehicle for agriculture may include a tractor, a cultivator, a transplanting machine, a binder, a combine, and a lawnmower. Examples of an industrial vehicle for construction may include a bulldozer, a scraper, an excavator, a crane truck, a dump truck, and a road roller. Examples of a vehicle may include a human-powered vehicle. Categories of vehicles are not limited to the examples described above. For example, examples of an automobile may include an industrial vehicle that can run on a road. One vehicle may be included in multiple categories. Examples of a vessel may include a wave runner, a boat, and a tanker. Examples of an aircraft may include a fixed-wing aircraft and a rotary-wing aircraft.

Figure 1:
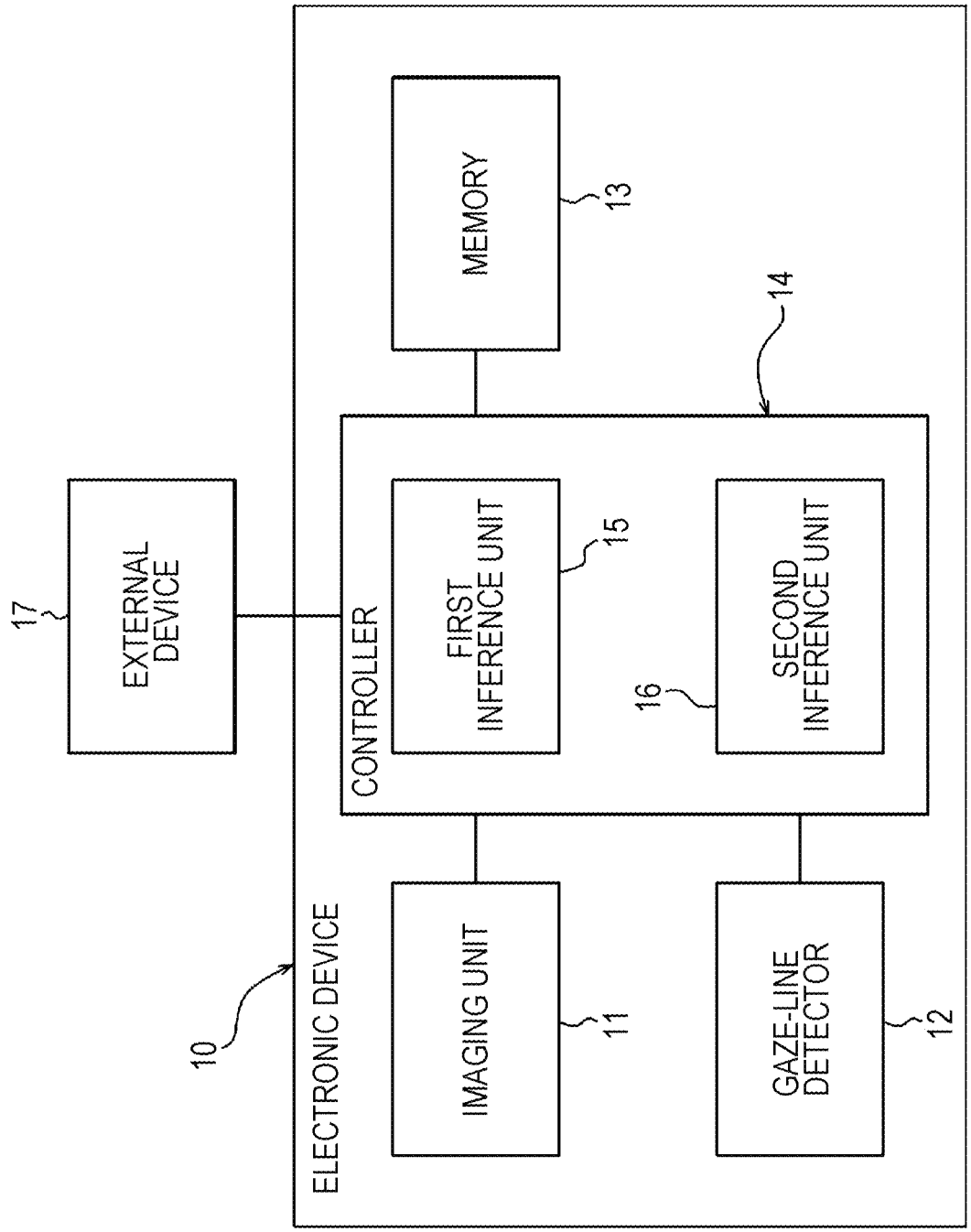
FIG. 1 is a block diagram schematically depicting a configuration of an electronic device according to the present embodiment.

As depicted in FIG. 1, an electronic device 10 according to an embodiment of the present disclosure includes an imaging unit 11, a gaze-line detector 12, a memory 13, and a controller 14.

The imaging unit 11 is fitted to a movable object, for example, so as to be able to capture a view in the moving direction of the movable object. The imaging unit 11 is, for example, a camera capable of capturing images at a speed of 30 fps. The imaging unit 11 is configured to create an image corresponding to a view by image capturing.

Figure 2:
FIG. 2 is an illustration for describing a relationship between an image and a gaze line detected by a gaze-line detector.
Figure 2:
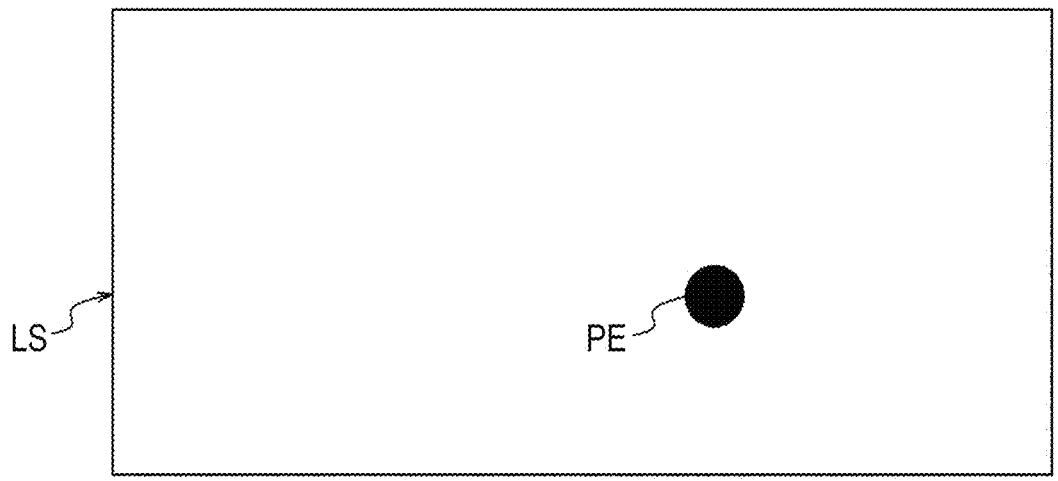

The gaze-line detector 12 is fitted to the movable object, for example, so as to be able to detect a gaze line of a subject seated at the driver's seat of the movable object. The gaze-line detector 12 is, for example, a contact-type eye tracker or a contactless eye tracker and is configured to detect a gaze line of a subject directed to a view. As depicted in FIG. 2, a gaze line LS is represented, for example, by the gaze directed at a position PE in a coordinate system that is the same as the coordinate system for an image IM generated by image capturing by the imaging unit 11.

The gaze-line detector 12 may be configured to obtain gaze-line data by detecting the movement of a gaze line in chronological order. More specifically, the gaze-line detector 12 may be configured to detect the position of a gaze line in an image at each time point and output, as the gaze-line data, a series of positions of the gaze line arranged in chronological order. The gaze-line detector 12 may be configured to detect the gaze line faster than the imaging unit 11 captures images. In other words, the gaze-line detector 12 may be configured to detect the gaze line at a higher rate than the imaging unit 11 captures images, accumulate a series of positions of the gaze line detected in chronological order, and output the accumulated positions as a path of the gaze line in an image.

The memory 13 includes any storage device, such as a random access memory (RAM) and a read only memory (ROM). The memory 13 stores various programs for operating the controller 14 and various kinds of information to be used by the controller 14.

The controller 14 includes one or more processors and memories. The processor may include a general-purpose processor that loads a specific program and that executes a specific function and a dedicated processor designed exclusively for a specific process. The dedicated processor may include an application specific integrated circuit (ASIC). The processor may include a programmable logic device (PLD). The PLD may include a field-programmable gate array (FPGA). The controller 14 may be either a system-on-a-chip (SoC) or a system-in-a-package (SiP), in which one or more processors cooperate with each other. The controller 14 is configured to control operation of each component in the electronic device 10.

The controller 14 is configured to normally cause the imaging unit 11 to perform continuous image capturing at a rate of, for example, 30 fps, and the controller 14 is configured to continuously acquire data of images IM. The controller 14 is configured to cause the gaze-line detector 12 to detect a gaze line LS of a subject during image capturing performed by the imaging unit 11, and the controller 14 is configured to acquire data of the gaze line LS detected during a time frame that substantially coincides with a time point of the capture of an image IM. A time frame that substantially coincides with a time point of the capture of an image IM may include a single time point of detection or may include multiple time points of detection during the period from a time point of the image capture immediately preceding the most recent capture of an image IM to a time point of the most recent capture of an image IM. In a case of a single time point of detection of a gaze line, the time frame that substantially coincides with a time point of the capture of an image IM need not include the exact time point of the capture of an image IM and may include a time point closest to the time point of the capture of an image IM in a cycle including the time point of the capture of an image IM. The controller 14 is configured to save the image IM and the gaze line LS to the memory 13 in association with each other, the gaze line LS being detected during a time frame that substantially coincides with a time point of the capture of the image IM.

The controller 14 may be configured to perform image processing on the acquired image IM. In a configuration, which is described below, in which learning by the inference units is performed by using an image, such as a semantic segmentation image, which is obtained by performing predetermined image processing on an ordinary captured image IM, the controller 14 is configured to save the image IM and the gaze line LS to the memory 13 in association with each other after performing the predetermined image processing on the acquired image IM. A semantic segmentation image is an image obtained by assigning a label or a category to all the pixels in an image.

The controller 14 is configured to estimate an alertness level of a subject based on the image IM and the gaze line LS, the gaze line LS being detected during a time frame that substantially coincides with a time point of the capture of the image IM. More specifically, the controller 14 is configured to serve as a first inference unit 15 and a second inference unit 16 to estimate an alertness level of a subject.

Figure 3:
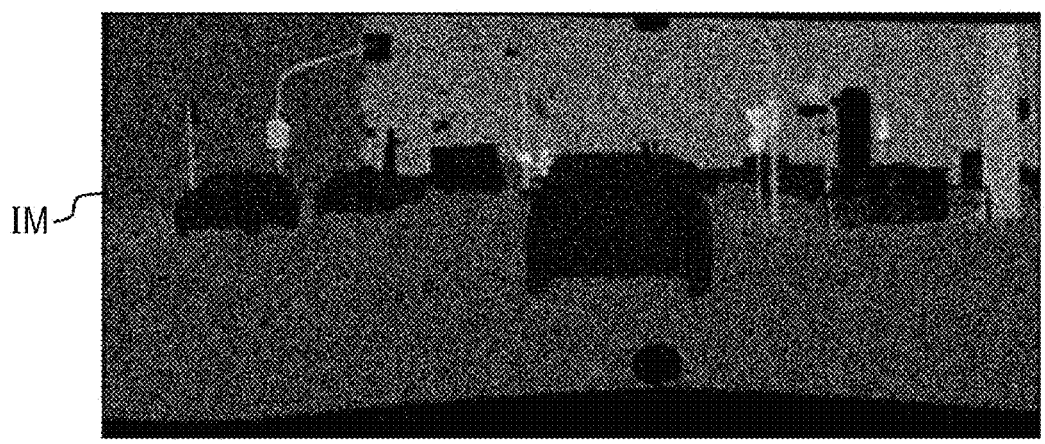
FIG. 3 is an illustration depicting a specific example of a gaze-line prediction map inferred from an image by a first inference unit.
Figure 3:
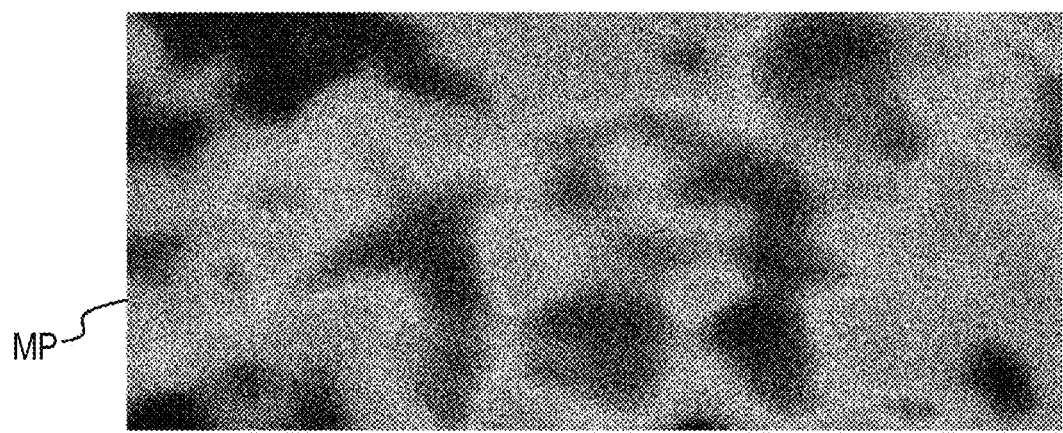

The first inference unit 15 is configured to infer a gaze-line prediction map of a subject based on the image IM. As depicted in FIG. 3, a gaze-line prediction map MP is a two dimensional map representing a probability of an ordinary subject gazing at each position in a specific view, that is, a probability of the gaze line LS being directed at the position. The gaze-line prediction map MP represents the probability at each position in the image IM corresponding to the specific view.

The second inference unit 16 is configured to infer biological information regarding an alertness level of the subject based on the gaze-line prediction map MP and the gaze line LS of the subject. Biological information regarding an alertness level includes an alertness level itself and biological information from which to calculate or estimate an alertness level. The information from which to calculate or estimate an alertness level includes at least one of the parameters such as a heartbeat, a brain wave, the number of blinking, and a percent of eyelid closure (PERCLOS). Accordingly, the second inference unit 16 of the controller 14 may estimate an alertness level based on the image IM and the gaze line LS. Alternatively, the second inference unit 16 may infer biological information from which to calculate or estimate an alertness level, and the alertness level may be calculated or estimated from the inferred biological information.

The first inference unit 15 and the second inference unit 16 are constructed by using, for example, a neural network having multiple layers. As described below, the first inference unit 15 and the second inference unit 16 are constructed by performing machine learning.

For example, the first inference unit 15 is configured to infer a gaze-line prediction map MP for a subject based on an image IM and a gaze line LS that are captured and detected, respectively, substantially at the same time. The second inference unit 16 is configured to estimate an alertness level based on a single gaze-line prediction map MP and a gaze line LS detected substantially at the same time as an image IM is captured, the image IM being used to infer the gaze-line prediction map MP.

Alternatively, for example, the first inference unit 15 has a configuration constructed based on learning regarding a relationship of a path of a gaze line to a single training image and is configured to infer a gaze-line prediction map MP for a subject based on a single image IM and a path of a gaze line LS detected during a time frame that substantially coincides with a time point of the capture of the single image IM. The second inference unit 16 is configured to estimate an alertness level based on the single gaze-line prediction map MP and a path of a gaze line LS detected during a time frame that substantially coincides with a time point of the capture of an image IM, the image IM being used to infer the gaze-line prediction map MP.

However, as described below, if the first inference unit 15 has a configuration constructed based on learning regarding a path including a portion where the moving speed of the gaze line LS is less than a threshold in the single training image, the first inference unit 15 may be configured to exclude a portion where the moving speed of the gaze line LS is more than or equal to the threshold in the path of the gaze line LS when inferring the gaze-line prediction map MP. In other words, the first inference unit 15 may exclude data obtained during a saccade. This is because a saccade is a movement during an eye movement to another gaze point, and the position of a gaze line during a saccade is not considered to be a gaze point. The first inference unit 15 may determine whether an eye movement is due to a saccade based on a parameter such as the moving speed of the position of a gaze line.

Alternatively, for example, as described below, the first inference unit 15 has a configuration constructed based on learning regarding multiple continuously captured training images and is configured to infer a single gaze-line prediction map MP based on multiple continuously captured images IM and a gaze line LS for each of the multiple images IM, that is, a gaze line LS associated with each of the multiple images IM. For example, the controller 14 may be configured to infer a single gaze-line prediction map MP based on frames of image IM captured during a predetermined time period immediately before the time point of the capture of the most recent image IM. The second inference unit 16 is configured to estimate an alertness level of a subject based on the single gaze-line prediction map MP and a gaze line LS detected substantially at the same time as the image IM is captured, the image IM being used to infer the gaze-line prediction map MP.

As described below, the controller 14 may have a configuration in which the first inference unit 15 is constructed based on learning regarding one or more training images for which the moving speed of a gaze line is less than a threshold, the one or more training images being selected from multiple continuously captured training images. The controller 14 may be configured to exclude, from multiple continuously captured images IM and a gaze line LS for the multiple continuously captured images IM, one or more combinations of a gaze line LS and an image IM associated with the gaze line LS, the gaze line LS having the moving speed more than or equal to a threshold, and the controller 14 may be configured to eventually estimate an alertness level of a subject based on the remaining gaze line LS and images IM. For example, the controller 14 may have a configuration in which a single gaze-line prediction map MP is inferred based on the gaze line LS associated with each of the multiple images IM and the controller 14 may be configured to exclude the above-mentioned combinations when inferring the single gaze-line prediction map MP and calculate an alertness level based on the gaze-line prediction map MP and a gaze line LS.

More specifically, at any detection time point, if the amount of movement of a gaze line LS from the position at an immediately preceding detection time point exceeds a threshold, the controller 14 may exclude a combination of the gaze line LS at the detection time point and an image IM associated with the gaze line LS at the detection time point. In other words, the controller 14 may exclude data obtained during a saccade. This is because a saccade is a movement during an eye movement to another gaze point, and the position of a gaze line during a saccade is not considered to be a gaze point. The controller 14 may determine whether an eye movement is due to a saccade based on the moving speed of the position of the gaze line.

The controller 14 is configured to output an estimated alertness level to an external device 17. The external device 17 is a device configured to perform a predetermined operation based on an alertness level. Examples of the external device 17 include a warning device for issuing a warning to a subject based on an alertness level, a driving support device for providing assistance in driving a movable object based on an alertness level, and a driving device for driving a movable object based on an alertness level.

The first inference unit 15 is constructed based on learning data obtained by machine learning regarding a relationship between training images and an actual gaze line. The machine learning is performed by using multiple combinations of a training image and an actual gaze line of a subject for training, the actual gaze line being directed to a view corresponding to the training image. Based on the relationship between training images and an actual gaze line, the first inference unit 15 is configured to estimate a probability of a gaze line LS being directed at each pixel or each region formed by multiple pixels in any image IM. The first inference unit 15 is configured to create a gaze-line inference map representing the probability at each position in any image IM in two dimensions.

The first inference unit 15 may be constructed based on learning data obtained by machine learning regarding a relationship between a training image and a path of an actual gaze line. The machine learning is performed by using a single training image and a path of an actual gaze line of a subject for training, the actual gaze line being directed to a view corresponding to the single training image. The first inference unit 15 may further be constructed based on machine learning regarding a single training image and a portion where the moving speed of a gaze line is less than a threshold in the single training image.

The first inference unit 15 may further be constructed based on machine learning regarding multiple continuously captured training images and an actual gaze line of a subject for training, the actual gaze line being directed to a view corresponding to each of the multiple training images. The first inference unit 15 may further be constructed based on one or more training images for which the moving speed of a gaze line is less than a threshold and the gaze line, the one or more training images being selected from multiple continuously captured training images.

The second inference unit 16 is constructed based on learning data obtained by machine learning regarding a relationship among a gaze-line prediction map for training, an actual gaze line, and biological information regarding an alertness level. The machine learning is performed by using multiple combinations of a gaze-line prediction map for training, an actual gaze line of a subject for training, and biological information regarding an alertness level of the subject for training. The gaze-line prediction map for training is inferred by the first inference unit 15 based on the training image, and the actual gaze line of the subject for training is directed to a view corresponding to the training image.

The second inference unit 16 may be constructed based on learning data obtained by machine learning regarding a relationship among a single gaze-line prediction map MP, a path of an actual gaze line of a subject for training, and biological information regarding an alertness level. The single gaze-line prediction map MP is inferred by the first inference unit 15 based on an image for training. The path of an actual gaze line of the subject for training is directed to a view corresponding to the training image.

Figure 4:
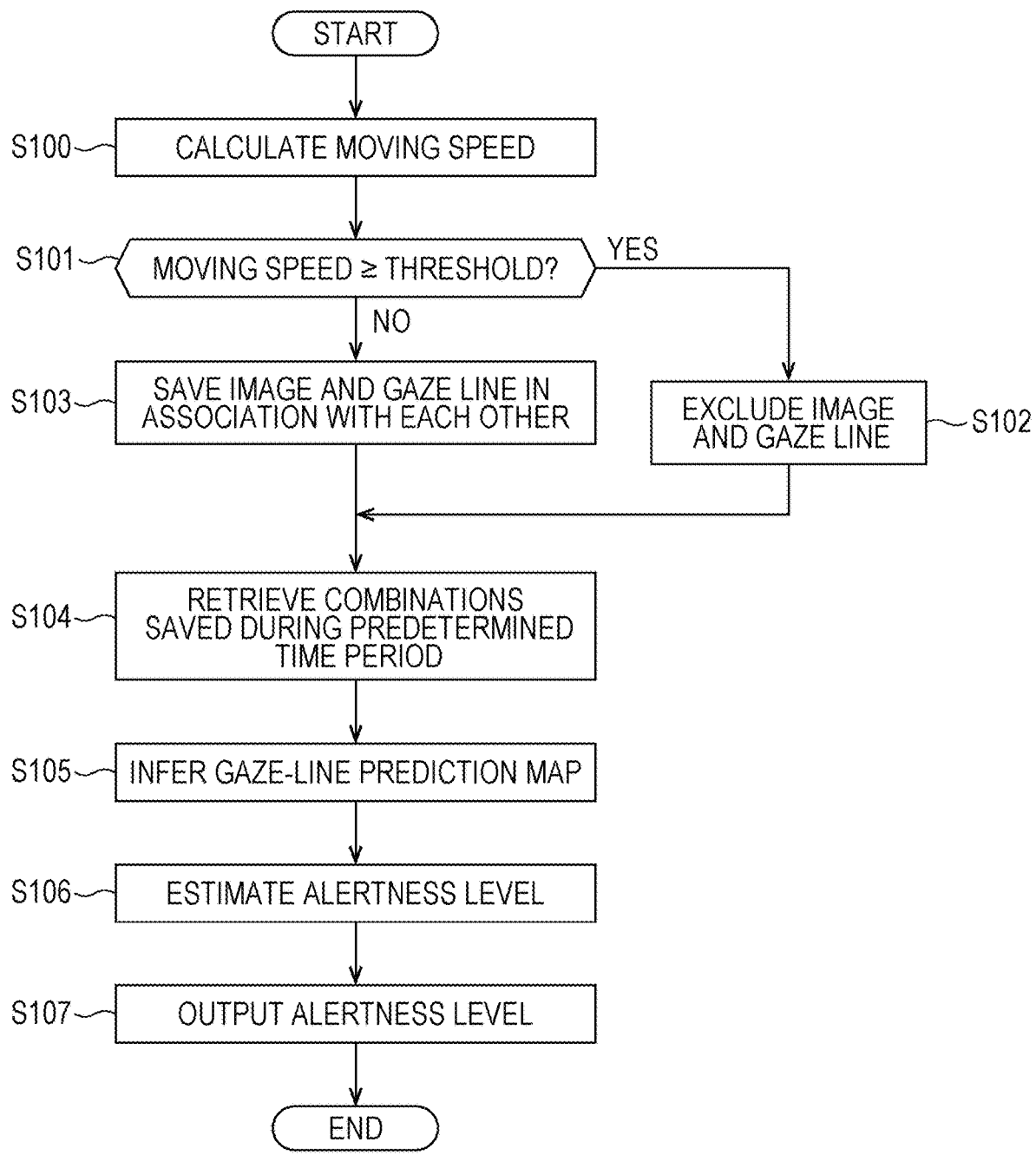
FIG. 4 is a flowchart for describing inference processing performed by a controller in FIG. 1.

Next, inference processing performed by the controller 14 according to the present embodiment will be described with reference to the flowchart in FIG. 4. The inference processing starts whenever the controller 14 acquires a frame of image IM and a gaze line LS.

In step S100, the controller 14 calculates the moving speed of the acquired gaze line LS based on the comparison with a position PE of the gaze line LS acquired immediately before the current acquisition. After the calculation, the process proceeds to step S101.

In step S101, the controller 14 determines whether the moving speed calculated in step S101 is more than or equal to a threshold. If the moving speed is more than or equal to the threshold, the process proceeds to step S102. If the moving speed is less than the threshold, the process proceeds to step S103.

In step S102, the controller 14 discards the image IM and the gaze line LS acquired at the start of the inference processing. After the discarding, the process proceeds to step S104.

In step S103, the controller 14 saves, to the memory 13, the image IM and the gaze line LS, which are acquired at the start of the inference processing, in association with each other. After the saving, the process proceeds to step S104.

In step S104, the controller 14 retrieves, from the memory 13, images IM in combinations of an image IM and a gaze line LS saved during a predetermined time period immediately preceding the start of the inference processing. After the retrieval, the process proceeds to step S105.

In step S105, the controller 14 serves as the first inference unit 15 to infer gaze-line prediction maps MP based on multiple images IM included in the combinations retrieved in step S104. After the inference, the process proceeds to step S106.

In step S106, the controller 14 serves as the second inference unit 16 to estimate an alertness level based on the multiple gaze-line prediction maps MP inferred in step S105 and the gaze line LS included in the combinations retrieved in step S104. After the inference, the process proceeds to step S107.

In step S107, the controller 14 outputs the alertness level estimated in step S106 to the external device 17. After the output, the inference processing ends.

In the electronic device 10 according to the present embodiment, which has the configuration described above, the controller 14 is configured to serve as the first inference unit 15 and the second inference unit 16 to estimate an alertness level of a subject based on at least one image IM and a gaze line LS. The first inference unit 15 is capable of inferring a gaze-line prediction map MP that is based on the at least one image IM and that represents a probability of finding the gaze line LS at each position in the at least one image IM, and the second inference unit 16 is capable of inferring biological information regarding an alertness level of the subject based on the gaze-line prediction map MP and the gaze line LS of the subject. Factors such as an object to be gazed at and a gaze direction generally depend on the views of various locations, such as an expressway, a downtown area, a suburban area, and a residential area. Consequently, it is difficult to improve the accuracy of estimating an alertness level by simply detecting only the movement of a gaze line LS. In contrast, the electronic device 10, which has the configuration described above, is capable of accurately estimating an alertness level based on at least one image IM and a gaze line LS that correspond to a view on each occasion because the electronic device 10 has learned about how objects to be gazed at by a person in various views change depending on an alertness level. Since the attention of a person is affected by the alertness level, the electronic device 10 is capable of improving the accuracy of estimating the attention of a subject in various situations.

In addition, the electronic device 10 according to the present embodiment is configured to estimate an alertness level of a subject based on multiple continuously captured images IM and a gaze line LS for each of the multiple images IM. The electronic device 10, which has such a configuration, is capable of more accurately estimating an alertness level based on images IM and a gaze line LS that correspond to a view on each occasion because the electronic device 10 has learned about how the gaze line LS in various views moves depending on an alertness level.

Further, the electronic device 10 according to the present embodiment is configured to exclude a combination of a gaze line LS whose moving speed exceeds a threshold and a corresponding image IM from multiple continuously captured images IM and a gaze line LS for each of the multiple images IM when estimating an alertness level of a subject. An object gazed at by a subject in a view is expected to be a factor exerting a great effect on an alertness level. Thus, a gaze line LS is expected to exert a marginal effect on an alertness level while rapidly moving from any object to another object, such as during a saccade. Accordingly, the electronic device 10, which has the configuration described above, is capable of more accurately estimating an alertness level because a combination of an image IM and a gaze line LS expected to exert a marginal effect on an alertness level is excluded.

Various modifications and corrections to the content of the present disclosure are feasible by those skilled in the art based on the present disclosure. Accordingly, such modifications and corrections are included in the scope of the present disclosure. For example, each functional unit, each method, each step, or the like in each embodiment can be added to another embodiment or replaced by a functional unit, a method, a step, or the like in another embodiment as long as logical consistency is maintained. In addition, multiple functional units, multiple methods, multiple steps, or the like in each embodiment can be combined into one or divided. Further, each embodiment in the present disclosure described above need not be put into practice exactly as is described in the embodiment, and may be put into practice with features combined or omitted appropriately.

Figure 5:
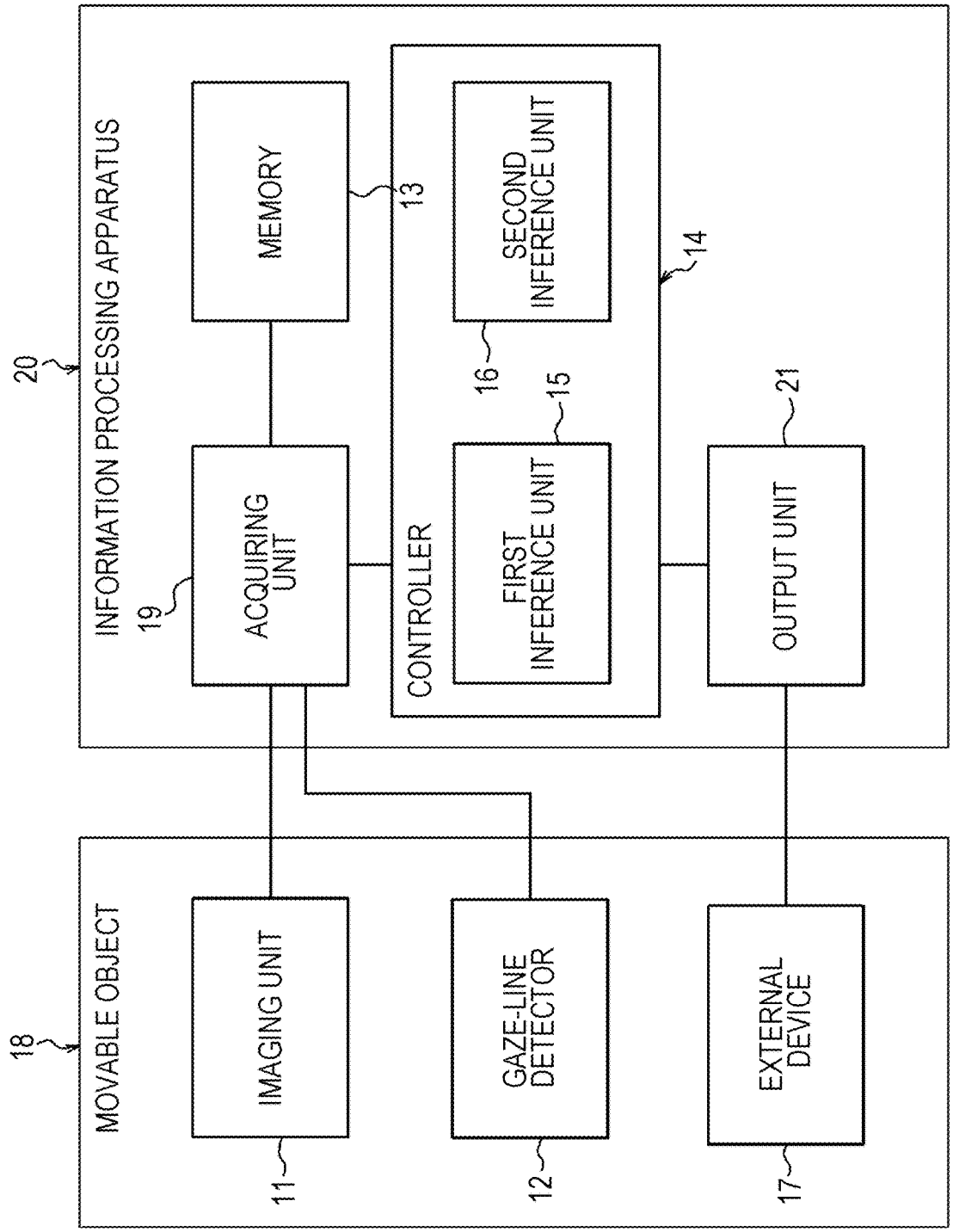
FIG. 5 is a block diagram schematically depicting a configuration of an information processing apparatus according to a modification to the present embodiment.

For example, in the present embodiment, the electronic device 10 includes the imaging unit 11 and the gaze-line detector 12, and the controller 14 is configured to acquire an image IM and a gaze line LS to estimate an alertness level. However, this configuration is only presented by way of illustration and not by way of limitation. As depicted in FIG. 5, for example, the imaging unit 11 and the gaze-line detector 12 may be fitted to a movable object 18. An information processing apparatus 20, such as a cloud server, which includes an acquiring unit 19 configured to acquire an image IM and a gaze line LS via communication with the movable object 18, may include a controller 14 and an output unit 21. The controller 14 has the same configuration as the controller 14 in the present embodiment and is configured to estimate an alertness level based on the image IM and the gaze line LS. The output unit 21 is configured to output the alertness level to an external device 17 in the movable object 18. Alternatively, a controller 14 of the movable object 18 may be configured to serve as one of the first and second inference units, and a controller of the external device 17 may be configured to serve as the other of the first and second inference units.

A number of aspects of the content of the present disclosure are presented as a series of operations performed by hardware such as a computer system that can execute program commands. Examples of the hardware such as a computer system include programmable data processing apparatuses such as a general-purpose computer, a personal computer (PC), a dedicated computer, a workstation, a personal communications system (PCS) or a personal mobile communications system, a cellular telephone, a cellular telephone having a data processing function, an RFID receiver, a game machine, an electronic notepad, a laptop computer, and a global positioning system (GPS) receiver. It is to be noted that various operations in each embodiment are performed either by a dedicated circuit (such as discrete logic gates interconnected with each other to perform a specific function) that implements program commands (software) or by components such as logic blocks and program modules that are executed by one or more processors. Examples of the one or more processors, which execute components such as logic blocks and program modules, include one or more microprocessors, a central processing unit (CPU), an application specific integrated circuit (ASIC), a digital signal processor (DSP), a programmable logic device (PLD), a field programmable gate array (FPGA), a processor, a controller, a micro-controller, a microprocessor, an electronic device, other devices designed to be able to perform the functions described herein, and/or a combination of the devices described herein. The embodiments described herein are implemented by using, for example, hardware, software, firmware, middleware, microcode, or a combination thereof. A command may be a program code or a code segment for executing a necessary task. A command can be stored in a non-transitory machine-readable storage medium or other media. A code segment may represent any combination of a procedure, a function, a subprogram, a program, a routine, a subroutine, a module, a software package, a class or a command, a data structure, and a program statement. A code segment transmits and/or receives information, data arguments, variables, or stored content to and/or from other code segments or hardware circuits, thereby connecting to the other code segments or the hardware circuits.

It is to be noted that a system, which includes various modules and/or units for performing specific functions, is disclosed herein and that such modules and units are schematically presented to provide simplified descriptions regarding the functionality and are not necessarily intended to represent any specific hardware and/or software. In this regard, such modules, units, and other components may be any hardware and/or software implemented to substantially perform the specific functions described herein. Various functions of different components may be provided either by using any combination of pieces of hardware and/or software or by using such pieces separately and may be used separately or in some combined forms. In this way, various aspects of the content of the present disclosure can be performed in many different modes, and such modes are all included in the scope of the content of the present disclosure.

REFERENCE SIGNS LIST

10 ELECTRONIC DEVICE
11 IMAGING UNIT
12 GAZE-LINE DETECTOR
13 MEMORY
14 CONTROLLER
15 FIRST INFERENCE UNIT
16 SECOND INFERENCE UNIT
17 EXTERNAL DEVICE
18 MOVABLE OBJECT
19 ACQUIRING UNIT
20 INFORMATION PROCESSING APPARATUS
21 OUTPUT UNIT
IM IMAGE
LS GAZE LINE
MP GAZE-LINE PREDICTION MAP
PE POSITION CORRESPONDING TO GAZE-LINE DIRECTION

The invention claimed is:

1. An electronic device comprising:
an imaging unit configured to create at least one image corresponding to a view in a moving direction of a vehicle of the electronic device by image capturing;
a gaze-line detector configured to detect a gaze line of a subject, the gaze line being directed to the view towards at least one object in a surrounding environment of the vehicle of the electronic device; and
a controller configured to estimate an alertness level of the subject based on the at least one image and the gaze line,
wherein the controller is configured to serve as
a first inference unit capable of inferring a gaze-line prediction map that is based on the at least one image and that represents a probability of finding the gaze line at each position in the at least one image, the first inference unit being constructed based on learning data obtained by machine learning regarding a relationship between a training image and a gaze line of a subject for training, the gaze line being directed to the training image, and
a second inference unit capable of inferring biological information regarding the alertness level of the subject based on the gaze-line prediction map and the gaze line of the subject, the second inference unit being constructed based on learning data obtained by machine learning regarding a relationship among a gaze-line prediction map for training inferred by the first inference unit based on the training image, the gaze line of the subject for training, the gaze line being directed to the training image, and biological information regarding an alertness level of the subject for training.

2. The electronic device according to claim 1, wherein the at least one image comprises a plurality of continuously captured images and the controller is configured to estimate the alertness level of the subject based on the plurality of continuously captured images and the gaze line for each of the plurality of images.

3. The electronic device according to claim 2, wherein the controller is configured to exclude a combination of a gaze line whose moving speed exceeds a threshold and a corresponding image from the plurality of continuously captured images and the gaze line for each of the plurality of continuously captured images when estimating the alertness level of the subject.

4. An information processing apparatus comprising:
an acquiring unit configured to acquire at least one image corresponding to a view in a moving direction of a vehicle of the information processing apparatus and a gaze line of a subject, the gaze line being directed to the view towards at least one object in a surrounding environment of the vehicle of the information processing apparatus;
a controller configured to estimate an alertness level of the subject based on the at least one image and the gaze line; and
an output unit configured to output the alertness level,
wherein the controller is configured to serve as a first inference unit capable of creating a gaze-line prediction map that is based on the at least one image and that represents a frequency of finding the gaze line in the at least one image, the first inference unit being constructed based on learning data obtained by machine learning regarding a relationship between a training image and a gaze line of a subject for training, the gaze line being directed to the training image, and as a second inference unit capable of inferring biological information regarding the alertness level of the subject based on the gaze-line prediction map and the gaze line of the subject, the second inference unit being constructed based on learning data obtained by machine learning regarding a relationship among a gaze-line prediction map for training inferred by the first inference unit based on the training image, the gaze line of the subject for training, the gaze line being directed to the training image, and biological information regarding an alertness level of the subject for training.

5. A method for inference, comprising the steps of:
creating at least one image corresponding to a view by image capturing in a moving direction of a vehicle;
detecting a gaze line of a subject, the gaze line being directed to the view towards at least one object in a surrounding environment of the vehicle; and
estimating an alertness level of the subject based on the at least one image and the gaze line,
wherein the step of estimating includes a first inference step in which a gaze-line prediction map can be inferred based on the at least one image, the gaze-line prediction map representing a probability of finding the gaze line at each position in the at least one image, the first inference step being constructed based on learning data obtained by machine learning regarding a relationship between a training image and a gaze line of a subject for training, the gaze line being directed to the training image, and a second inference step in which biological information regarding the alertness level of the subject can be inferred based on the gaze-line prediction map and the gaze line of the subject, the second inference step being constructed based on learning data obtained by machine learning regarding a relationship among a gaze-line prediction map for training inferred in the first inference step based on the training image, the gaze line of the subject for training, the gaze line being directed to the training image, and biological information regarding an alertness level of the subject for training.

6. A non-transitory computer-readable recording medium including a program for inference causing a computer to serve as an imaging unit configured to create at least one image corresponding to a view in a moving direction of a vehicle by image capturing;

a gaze-line detector configured to detect a gaze line of a subject, the gaze line being directed to the view towards at least one object in a surrounding environment of the vehicle; and a controller configured to estimate an alertness level of the subject based on the at least one image and the gaze line, wherein the controller is configured to serve as a first inference unit capable of inferring a gaze-line prediction map that is based on the at least one image and that represents a probability of finding the gaze line at each position in the at least one image, the first inference unit being constructed based on learning data obtained by machine learning regarding a relationship between a training image and a gaze line of a subject for training, the gaze line being directed to the training image, and a second inference unit capable of inferring biological information regarding the alertness level of the subject based on the gaze-line prediction map and the gaze line of the subject, the second inference unit being constructed based on learning data obtained by machine learning regarding a relationship among a gaze-line prediction map for training inferred by the first inference unit based on the training image, the gaze line of the subject for training, the gaze line being directed to the training image, and biological information regarding an alertness level of the subject for training.

* * * * *